United States Patent [19]
Daniels

[11] 3,834,211

[45] Sept. 10, 1974

[54] A METHOD OF MANUFACTURING MULTIPLE PARTS FROM A WORKPIECE

[75] Inventor: Dennis Daniels, Bellevue, Wash.

[73] Assignee: US Amada, Ltd., Seattle, Wash.

[22] Filed: Nov. 6, 1972

[21] Appl. No.: 304,102

[52] U.S. Cl. ..................... 72/324, 72/332, 72/334, 72/337, 72/338, 113/116 Y
[51] Int. Cl. ........................................... B21k 27/06
[58] Field of Search ............ 72/324, 326, 329, 330, 72/331, 332, 334, 337, 338; 113/116 Y, 116 HA, 116 V, 116 HH; 83/33, 268

[56] References Cited
UNITED STATES PATENTS

| | | | |
|---|---|---|---|
| 2,779,408 | 1/1957 | Miller et al. | 83/33 |
| 3,079,825 | 3/1963 | Biben | 83/33 |
| 3,229,357 | 1/1966 | Burstin | 83/33 |
| 3,650,141 | 3/1972 | Pepe | 83/33 |

*Primary Examiner*—Charles W. Lanham
*Assistant Examiner*—James R. Duzan
*Attorney, Agent, or Firm*—Seed, Berry, Vernon & Baynham

[57] ABSTRACT

A workpiece from which multiple parts are to be separated is provided with tabs placed in the workpiece during numerically controlled punching operation. The tabs extend from the body of the workpiece and are provided with two cut edges parallel to each other and to lines of division for separating the part from the workpiece. Shearing of the part from the workpiece is accomplished by positioning the workpiece relative to the shearing knife by the use of the edges of the tabs. A die having parallel edges spaced apart the same distance as the edges of the tab is aligned with a shearing knife. A single tab placed in the die will position the workpiece along an axis and will restrict rotation of the workpiece. The tab will be removed when the part is sheared from the workpiece. The article is thus a flat piece of metal provided with a plurality of tabs positioned along lines of division of the parts to be separated from the workpiece with the long edges of the tabs overlying lines of division so that the tabs are separated from the article as parts are removed.

7 Claims, 11 Drawing Figures

A METHOD OF MANUFACTURING MULTIPLE PARTS FROM A WORKPIECE

BACKGROUND OF THE INVENTION

1. Field of the Invention

This invention pertains to punching and shearing techniques for removing several small parts from a large workpiece and in which means are provided on the workpiece during the punching operation to align the workpiece in the subsequent shearing operation.

2. Description of the Prior Art

Heretofore, it has been difficult to properly position a large workpiece from which multiple parts are to be separated during the shearing operation so that shearing is accomplished in perfect alignment with the lines of separation of the part from the workpiece. Prior art techniques of forming aligning holes in the workpiece during the time of punching, have not proven satisfactory.

SUMMARY OF THE INVENTION

It is an object of this invention to provide a method of punching and shearing multiple parts from a large workpiece in which the workpiece may be quickly and accurately positioned for the shearing operation.

It is another object of this invention to provide a shearing apparatus which allows the workpiece to be positioned relative to the shearing knife and die by appendages secured directly to the workpiece.

It is another object of this invention to provide a punching and shearing method in which alignment of the workpiece during shearing can be done with a minimum number of alignment tabs.

It is another object of this invention to provide a workpiece having a plurality of elongated shear alignment tabs protruding from the workpiece along the imaginary lines of separation of the parts from the workpiece.

Basically, the method of this invention employs the steps of first forming a plurality of outwardly extending tabs in the workpiece during the punching operation with the tabs being positioned along the lines of separation of the multiple parts and second successively positioning the tabs in a shearing apparatus and shearing the workpiece along the lines of separation to divide the workpiece into the multiple parts. In the preferred form these tabs are along the division lines and include spaced elongated side edges which overlay the division lines so that the tabs can be separated from the workpiece along with the parts. Obviously the tabs could be narrower than the division lines, however, this would result in wasted material.

In the preferred form the apparatus includes a die having parallel edges spaced apart the same or a greater distance than the side edges of the elongated tab. The tab is long enough to position the workpiece in the die both laterally of the edges and against rotation so that only one tab is necessary for holding the workpiece in proper alignment for shearing.

The workpiece formed during the punching operation has several tabs along or within dividing lines perpendicular to one another. The tabs having elongated side edges of greater length than the widths of the tabs.

DESCRIPTION OF THE PREFERRED EMBODIMENTS

Figure 1:
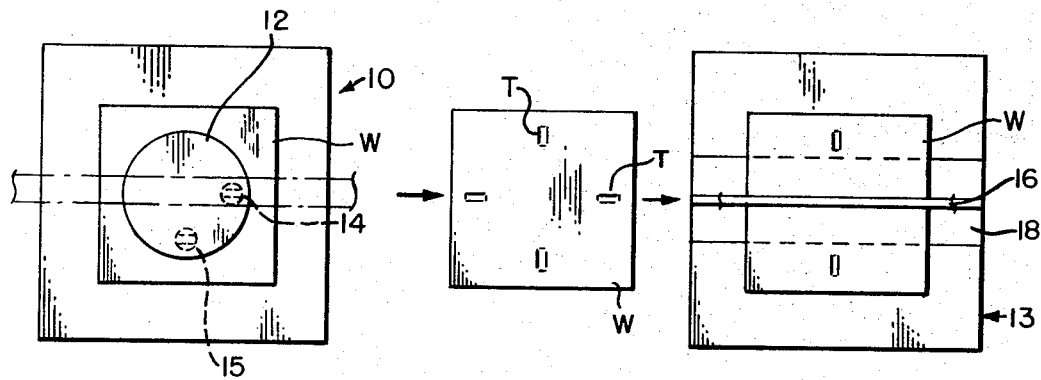
FIG. 1 is a schematic plan view of a punch press and shearing apparatus suitable for performing the method of the invention.

As best shown in FIG. 1 a punch press 10 and shearing apparatus 13 are provided for performing the steps of the method of this invention. The punch press 10 can be of any conventional turret type having a turret 12 in which is provided a first punch and die set 14 and a second punch and die set 15 identical in shape but rotatable into a punching position at right angles to each other. Another suitable punch press for this operation is shown in my co-pending patent application Ser. No. 113,042, filing date Feb. 19, 1971 in U.S. Pat. No. 3,717.061.

Since the punch and dies are identical, only one will be described. The punch and die set 14 includes a punch 20 having a thickness "*t*" equal to the width of the tab T to be punched and a length "L" considerably longer than the thickness "*t*" and equal to the length of the tab to be cut. The die is provided with a body 22 having cutting edges 24 spaced approximately the thickness of the tab to be cut and supporting therebetween a rubber plate 26 and a conventional steel stripper 28. As is well understood in this art, movement of the punch 20 through the workpiece W will cut the workpiece along two parallel lines forming a tab T with parallel, elongated edges T1 and T2 but with the ends of the tab stretched only slightly and still solidly connected to the workpiece. A tab formed in this manner can extend to a considerable depth below the workpiece and yet due to its solid connection throughout the cross section at each end of the tab it will remain securely fastened to the workpiece and capable of withstanding a considerable amount of stress during later use of the tab. The stripper as is well known, will be pressed down to compress the rubber and when the punch is withdrawn, the rubber will move the stripper upwardly freeing the tab from the die.

Figure 2:
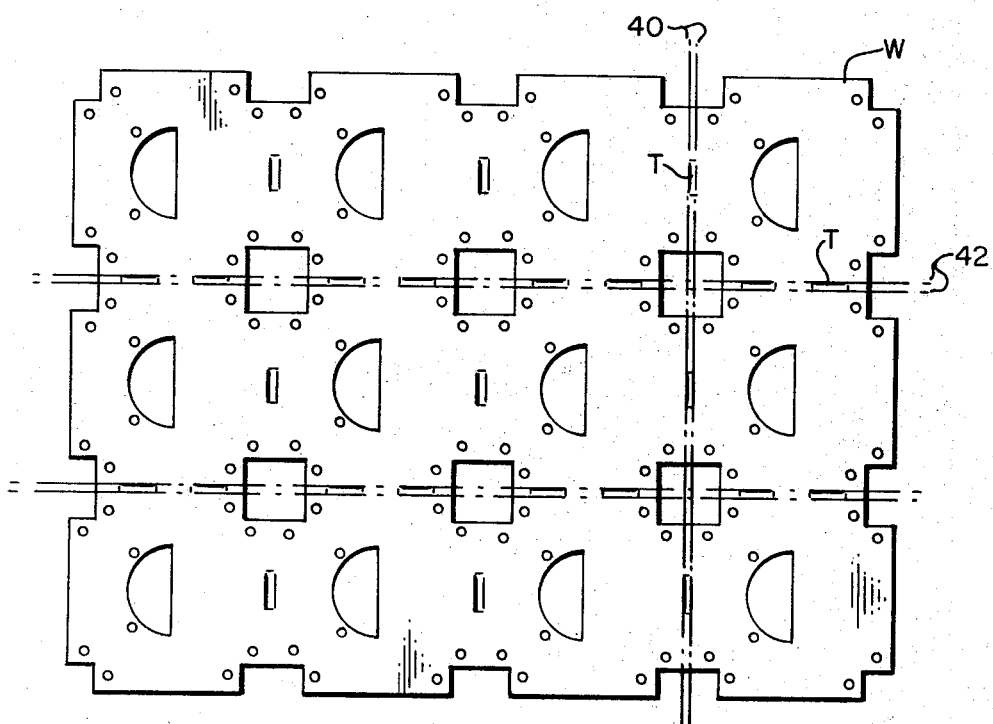
FIG. 2 is a plan of a typical workpiece from which multiple parts are to be separated and embodying the principles of the invention.
Figure 8:
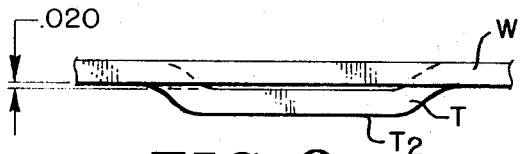
FIG. 8 is a fragmentary side elevation of a typical tab made according to the principles of the invention.
Figure 9:
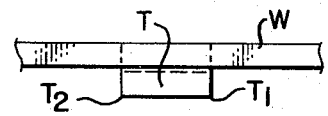
FIG. 9 is an end elevation of the tab shown in FIG. 8.
Figure 10:
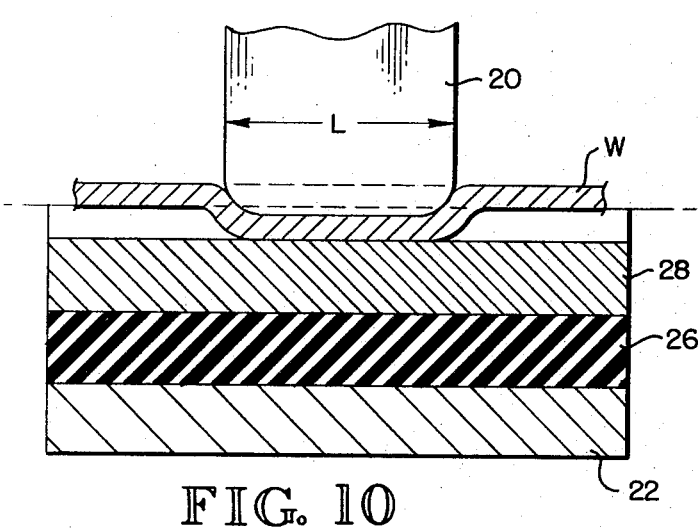
FIG. 10 is an illustration of a punch and die suitable for making the tabs.
Figure 11:
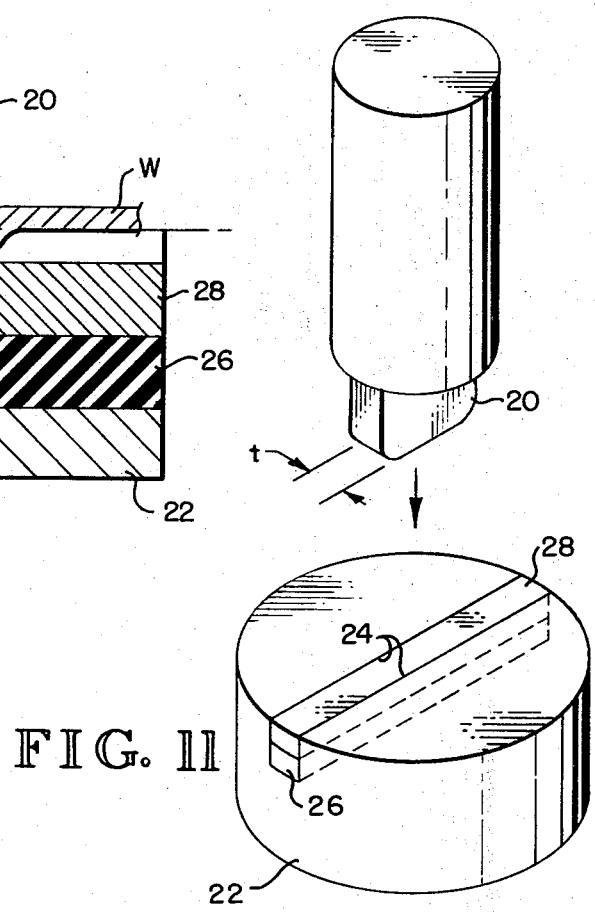
FIG. 11 is an exploded isometric of the punch and die shown in FIG. 10.

As is best shown in FIGS. 8 and 9, the tab T is thus formed having elongated edges T1 and T2 which in the preferred embodiment overly spaced dividing lines 40 (FIG. 2) or 42 (FIG. 2). As will become clearer from a further description, the cutting lines are along the edges of the tabs so that the tabs are removed as part of the shearing operation.

During the normal programmed sequence of operation of movement of the workpiece W through the punch press 10, the tabs T will be punched into the workpiece either along the lines 40 or lines 42. Since lines 40 and 42 are at right angles to one another, the tabs also will be oriented at right angles to one another and thus punch and die set 14 will be used for making tabs along one set of the lines whereas punch and die set 15 will be used to make the tabs along the other lines. The tabs, as will be further described, are used for positioning the workpiece in the shearing apparatus. Since the tabs can be punched into the workpiece during the punching operation, the method has the advantage of utilizing the numerical control of the punching operation for accurately positioning the tabs at the desired locations in the workpiece. As is obvious, the accuracy of the positioning of the tabs in the workpiece is thus dependent solely upon the tolerances available in the punch press and the shearing accuracy is dependent solely in the tolerances between the shear 16 and die 18 in the shearing apparatus. The alignment of the workpiece in the shearing apparatus is not affected by the tolerances in the workpiece positioning mechanism of the shearing apparatus as in prior art shearing apparatus and thus closer tolerances may be maintained than has heretofore been possible.

Figure 3:
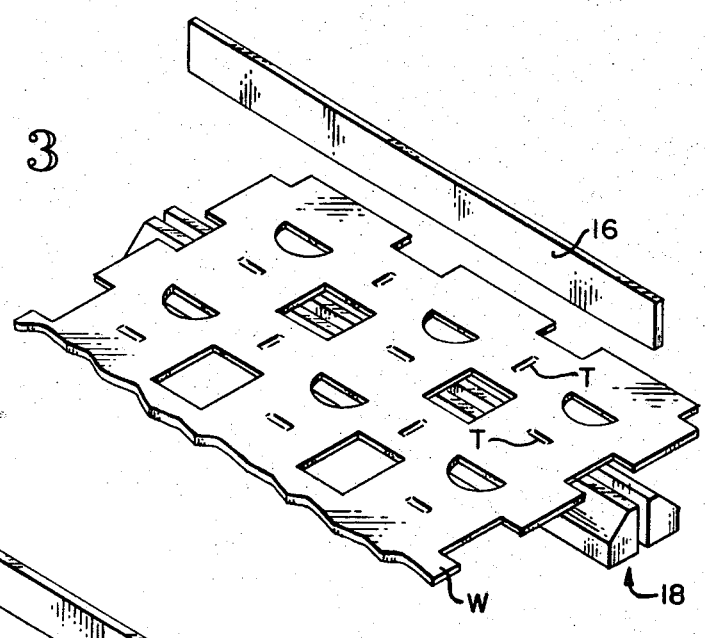
FIG. 3 is a schematic illustration of the workpiece of FIG. 2 positioned between a shearing knife and die embodying the principles of the invention.
Figure 4:
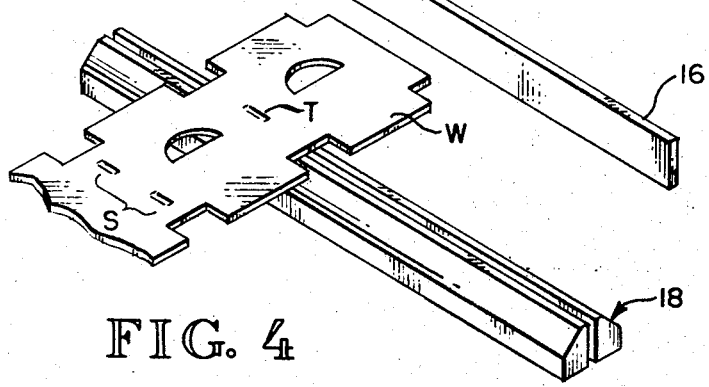
FIG. 4 is a fragment of the workpiece shown in FIGS. 2 and 3 with an alternative tab provision shown in this view for purposes of clarity.
Figure 5:
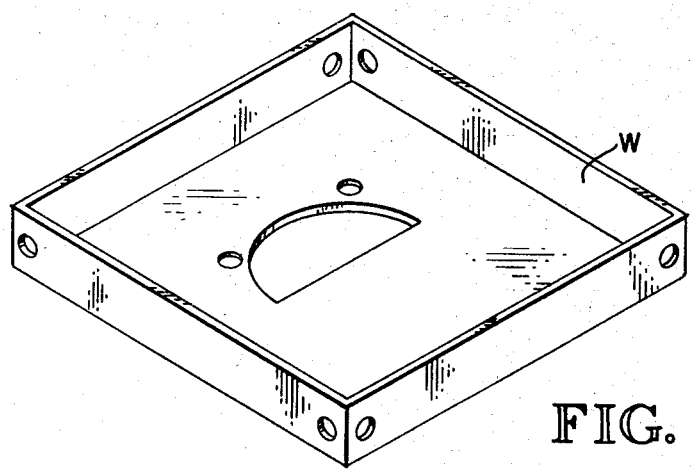
FIG. 5 is a typical part cut from the workpiece shown in FIGS. 2–4.
Figure 6:
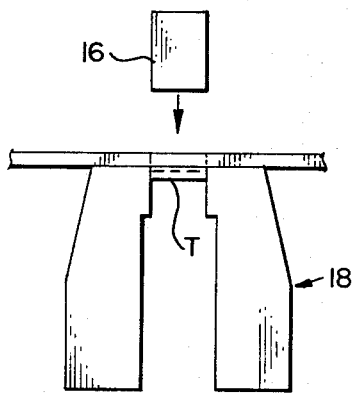
FIG. 6 is a section of the knife and die shown in FIG. 4 in one operative position.
Figure 7:
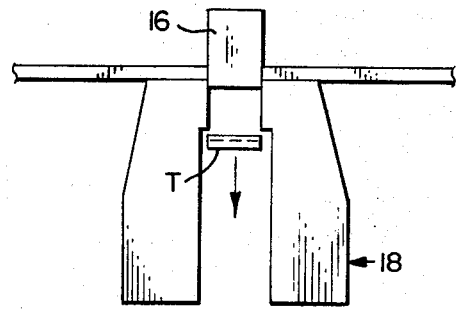
FIG. 7 is a section taken through the knife and die of FIG. 4 illustrating the shearing knife passing into the die.

The shearing knife 16 includes an elongated bar having a sharpened lower edge with a thickness approximately equal to the thickness "t" of the tab T. The cutting edges of the die 18 are correspondingly spaced approximately the same distance as the thickness "t" of the tab T with allowance being made for the normal shearing fit between the shearing knife 16 and the die 18. Thus as in the preferred form, shearing of the workpiece along the lines of division 40 or 42 will separate a part or a string of interconnected parts from the workpiece W removing the tab as well from the part. As best shown in FIGS. 6 and 7 the elongated edges T1 and T2 of the tab T will snugly engage the parallel cutting edges of the die 18 and because of their elongated length the side edges T1 and T2 of a single tab T are sufficient to position the workpiece in the die 18 laterally and against skewing. A typical example is shown in FIG. 4 in which a single tab T is within the die 18. For extremely long cuts as in FIG. 3, several tabs for different parts can be joined together in the die to assure accuracy over the longer dimensions.

In the alternative, two smaller tabs S (FIG. 4) can be used rather than a single tab in order to increase the length dimension of the tab. A single tab offers the advantage over two smaller tabs of deformation to a greater depth and fewer punching operations, thus the single tab is preferred.

In a typical operation the workpiece W includes a flat member having a plurality of protruding tabs each having a length dimension formed between parallel edges. The parallel edges of the tabs each overly an imaginary set of dividing lines for separating the parts from the workpiece. Several sets of the dividing lines are provided at generally right angles with one another. The dividing lines, of course, can be at any angle necessary to optomize the shearing of multiple parts from the workpiece.

In a typical preferred operation, the workpiece is placed in the punch press and run through a sequence of punching operations in which the tabs are placed on the dividing lines in a normal sequence of operations performed on the workpiece. The workpiece is then positioned on the shearing apparatus 12 with the tabs between the first dividing lines to be separated placed snugly in the die 18. Shearing operations are then repeated until the workpiece has been passed completely through the shearing apparatus. The strings of multiple parts are then individually sheared into the final parts. The sequence of steps may be varied as desired depending upon the number and shape of the final parts.

While the preferred forms of the invention have been illustrated and described, it should be understood that variations and modifications will be apparent to one skilled in the art without deparitng from the principles of the invention. Accordingly, the invention is not to be limited to the specific embodiments illustrated and described.

The embodiments of an invention in which an exclusive property or privelege is claimed are defined as follows:

1. Method of manufacturing multiple parts from a large workpiece comprising:
   forming in a punch press a plurality of elongated, length at least twice the width, tabs in the workpiece at least within the lines of separation of the multiple parts during the same punching operation in which the formation of other part openings are being made, each tab with a depth to workpiece thickness ratio of at least 1:1 or greater,
   successively positioning the tabs in a shearing apparatus and shearing the workpiece along said lines of separation to divide the workpiece into parts and removing the tabs along the division lines as the part is separated from the workpiece.

2. The method of claim 1, said shearing apparatus including a shearing knife and a die, said step of forming the tabs including forming at least one tab with two elongated edges parallel to each other and separated from the workpiece, and smooth, gently curved ends joining the tab to the workpiece, said step of shearing including positioning the workpiece relative to said shearing knife by aligning the two parallel edges of the tab in a die relative to said shearing knife whereby a single tab can position the workpiece laterally and against skewing.

3. The method of claim 2 said die having two spaced edges parallel to each other and to said line of division, said positioning step including abutting the edges of said tab against the edges of said die.

4. The method of claim 1 said step of forming each tab including pressing the material of the workpiece into a die along two parallel edges only to an extent to cut the workpiece and produce an extended strip of material joined to the workpiece along the two opposite ends of the tab for forming a tab of a depth and length sufficient to position the workpiece transversely to the tab and against skewing with a strong connection at the ends of the tab.

5. The method of claim 4, said shearing apparatus including a shearing knife, said step of forming the tabs including forming at least one tab with the two elongated edges parallel to each other and to said lines of division and separated from the workpiece, said step of shearing including positioning the workpiece relative to said shearing knife by aligning the two parallel edges of the tab relative to said shearing knife whereby a single tab can position the workpiece for removing the part, said shearing apparatus including a die having two spaced edges parallel to each other and to said lines of division, said positioning step including abutting the edges of said tab against the edges of said die, and said step of shearing including removing the tabs along the division lines as the part is separated from the workpiece.

6. The method of claim 1 said step of forming a plurality of tabs including forming tabs along sets of lines of division which are perpendicular to one another.

7. The method of claim 1, said step of forming the tabs including forming each tab with at least two elongated parallel edges separated from the workpiece to allow protrusion of the tab outwardly of the workpiece a substantial distance.

* * * * *